(12) United States Patent
Sankaranarayanan et al.

(10) Patent No.: US 9,645,763 B2
(45) Date of Patent: May 9, 2017

(54) FRAMEWORK FOR BALANCING ROBUSTNESS AND LATENCY DURING COLLECTION OF STATISTICS FROM SOFT READS

(71) Applicant: Seagate Technology LLC, Cupertino, CA (US)

(72) Inventors: Sundararajan Sankaranarayanan, Fremont, CA (US); Erich F. Haratsch, San Jose, CA (US)

(73) Assignee: Seagate Technology LLC, Cupertino, CA (US)

( * ) Notice: Subject to any disclaimer, the term of this patent is extended or adjusted under 35 U.S.C. 154(b) by 173 days.

(21) Appl. No.: 14/181,893

(22) Filed: Feb. 17, 2014

(65) Prior Publication Data

US 2015/0199149 A1    Jul. 16, 2015

Related U.S. Application Data

(60) Provisional application No. 61/926,488, filed on Jan. 13, 2014.

(51) Int. Cl.
*G06F 3/06* (2006.01)
(52) U.S. Cl.
CPC ............ *G06F 3/0653* (2013.01); *G06F 3/061* (2013.01); *G06F 3/0617* (2013.01); *G06F 3/0688* (2013.01)
(58) Field of Classification Search
CPC ...... G06F 3/0611; G06F 3/0616; G06F 3/064; G06F 3/0653; G06F 3/0688; G06F 12/0246; G06F 3/0679; G06F 3/061; G06F 13/1668; G06F 2212/7208; G06F 3/0617; G06F 11/10; G06F 2212/222; G06F 3/0614; G06F 3/0628
See application file for complete search history.

(56) References Cited

U.S. PATENT DOCUMENTS

| | | | |
|---|---|---|---|
| 7,844,879 B2 | 11/2010 | Ramamoorthy et al. | 714/763 |
| 7,975,192 B2 | 7/2011 | Sommer et al. | 714/719 |
| 8,099,652 B1 | 1/2012 | Alrod et al. | 714/773 |
| 8,145,984 B2 | 3/2012 | Sommer et al. | 714/797 |
| 8,321,625 B2 | 11/2012 | Weingarten et al. | 711/103 |
| 8,335,977 B2 | 12/2012 | Weingarten et al. | 714/794 |
| 8,341,335 B2 | 12/2012 | Weingarten et al. | 711/103 |
| 8,369,141 B2 | 2/2013 | Sommer et al. | 365/185.03 |
| 8,427,867 B2 | 4/2013 | Weingarten | 365/185.02 |
| 8,443,242 B2 | 5/2013 | Weingarten et al. | 714/704 |

(Continued)

OTHER PUBLICATIONS

J. Wang, G. Dong, T. Zhang and R. Wesel, "Mutual-Information Optimized Quantization for LDPC Decoding of Accurately Modeled Flash Data", Feb. 7, 2012.

(Continued)

*Primary Examiner* — Zhuo Li
(74) *Attorney, Agent, or Firm* — Christopher P. Maiorana, PC

(57) ABSTRACT

An apparatus includes a plurality of memory devices and a controller. The controller is coupled to the plurality of memory devices and configured to store data in the plurality of memory devices using units of super-blocks. Each super-block comprises a block from each of the plurality of memory devices and the controller balances time efficiency and robustness during collection of statistics from soft reads of each super-block.

18 Claims, 10 Drawing Sheets

(56) References Cited

U.S. PATENT DOCUMENTS

| | | | |
|---|---|---|---|
| 8,467,249 B2 | 6/2013 | Katz et al. | 365/185.18 |
| 8,473,812 B2 | 6/2013 | Ramamoorthy et al. | 714/763 |
| 8,482,978 B1 | 7/2013 | Perlmutter et al. | 365/185.03 |
| 8,498,152 B2 | 7/2013 | Alrod et al. | 365/185.03 |
| 8,508,991 B2 | 8/2013 | Yang et al. | 365/185.03 |
| 8,547,740 B2 | 10/2013 | Sommer et al. | 365/185.03 |
| 8,576,622 B2 | 11/2013 | Yoon et al. | 365/185.03 |
| 8,605,502 B1 | 12/2013 | Desireddi et al. | 365/185.03 |
| 9,021,332 B2* | 4/2015 | Haratsch et al. | 714/763 |
| 2004/0264254 A1* | 12/2004 | Eggleston | G06F 11/1068 365/185.33 |
| 2011/0145487 A1* | 6/2011 | Haratsch et al. | 711/103 |
| 2011/0225350 A1* | 9/2011 | Burger et al. | 711/103 |
| 2013/0104005 A1 | 4/2013 | Weingarten et al. | 714/773 |
| 2013/0290813 A1 | 10/2013 | Ramamoorthy et al. | 714/773 |
| 2013/0343131 A1* | 12/2013 | Wu | G11C 16/26 365/185.24 |
| 2014/0040704 A1* | 2/2014 | Wu et al. | 714/773 |
| 2014/0156966 A1* | 6/2014 | Ellis | G06F 3/064 711/173 |
| 2015/0092494 A1* | 4/2015 | Rhie | G11C 16/16 365/185.12 |

OTHER PUBLICATIONS

Y. Cai, E. F. Haratsch, O. Mutlu and K. Mai, "Threshold Voltage Distribution in MLC NAND Flash Memory: Characterization, Analysis, and Modeling", 2013.

Jiadong Wang, et al., "Soft Information for LDPC Decoding in Flash: Mutual-Information Optimized Quantization", Global Telecommunications Conference (GLOBECOM2011), 2011 IEEE, 6 pages.

Jiadong Wang et al., "LDPC Decoding with Limited-Precision Soft Information in Flash Memories", arXiv:1210.0149v1 [cs.IT] Sep. 29, 2012, 27 pages.

* cited by examiner

FRAMEWORK FOR BALANCING ROBUSTNESS AND LATENCY DURING COLLECTION OF STATISTICS FROM SOFT READS

This application relates to U.S. Provisional Application No. 61/926,488, filed Jan. 13, 2014, which is hereby incorporated by reference in its entirety.

FIELD OF THE INVENTION

The invention relates to solid state storage controllers generally and, more particularly, to a method and/or apparatus for implementing a framework for balancing robustness and latency during collection of statistics from soft reads.

BACKGROUND

A flash channel changes (degrades) over time with program-erase cycles (PECs), retention, and read disturb effects. An effective detection and coding/decoding solution needs to adapt to the changes in the flash channel. Typically, detector/decoder designs are governed by an assumed channel model. Such channel models are described or defined by a set of parameters. A typical model for a flash cell uses pulse-amplitude modulation (PAM) signaling with an additive white Gaussian noise (AWGN) channel. An AWGN channel with 4-PAM signaling is parameterized with four means corresponding to signal amplitudes and four sigmas corresponding to the one-sided power spectral density of the AWGN. Adaptations to the changes in the flash channel are based on a channel tracking mechanism using statistics collected for an adaptive tracking algorithm to track variations in the channel and consequently, update the set of channel parameters. The updated set of channel parameters is used to adjust hard/soft read reference voltages, re-compute bit reliability messages, etc. The channel tracking mechanism may also be used to estimate inter-cell interference (ICI) and variation in ICI over time.

It would be desirable to have a framework for balancing robustness and latency during collection of statistics from soft reads of the flash channel.

SUMMARY

The invention concerns an apparatus including a plurality of memory devices and a controller. The controller is coupled to the plurality of memory devices and configured to store data in the plurality of memory devices using units of super-blocks. Each super-block comprises a block from each of the plurality of memory devices and the controller balances time efficiency and robustness during collection of statistics from soft reads of each super-block.

BRIEF DESCRIPTION OF THE FIGURES

Embodiments of the invention will be apparent from the following detailed description and the appended claims and drawings in which:

DETAILED DESCRIPTION OF THE EMBODIMENTS

In various embodiments, a framework is provided for effectively collecting statistics from soft reads. Robustness of statistics is high with a large sample set, but collecting a large sample set incurs a time delay resulting in high latency. High latency strains flash performance and, therefore, is undesirable. A balance between robustness and time efficiency needs to be achieved to meet or beat flash performance specifications. A framework in accordance with an embodiment of the invention allows for achieving a balance between robustness and latency by, for example, tuning various parameters defined within the framework. The latency aspect is addressed by parallelizing soft reads across dies within a super-block. The robustness aspect is addressed by introducing local averaging of collected statistics. In addition, local averaging (or post-processing) is designed to neutralize effects of page-to-page and die-to-die variations on the estimated statistics. The parameters built within the framework allow for controlling the amount of read parallelization and local averaging. Increasing the amount of local averaging improves robustness at the cost of speed while increasing the amount of parallelization improves speed at the cost of robustness.

Embodiments of the invention include providing a general framework for collecting statistics from soft reads that may (i) enable flexibility in the framework through underlying parameters, (ii) allow easy optimization of a flash channel, (iii) implement parallelization of lower and upper page reads and local averaging (or post-processing) of collected statistics, (iv) allow for achieving a balance between time efficiency and robustness, respectively, (v) leverage dies within a super-block efficiently to make data or statistics collection independent of page-to-page and die-to-die variation typical of flash media, and/or (vi) be implemented in a solid state disk or drive (SSD).

Figure 1:
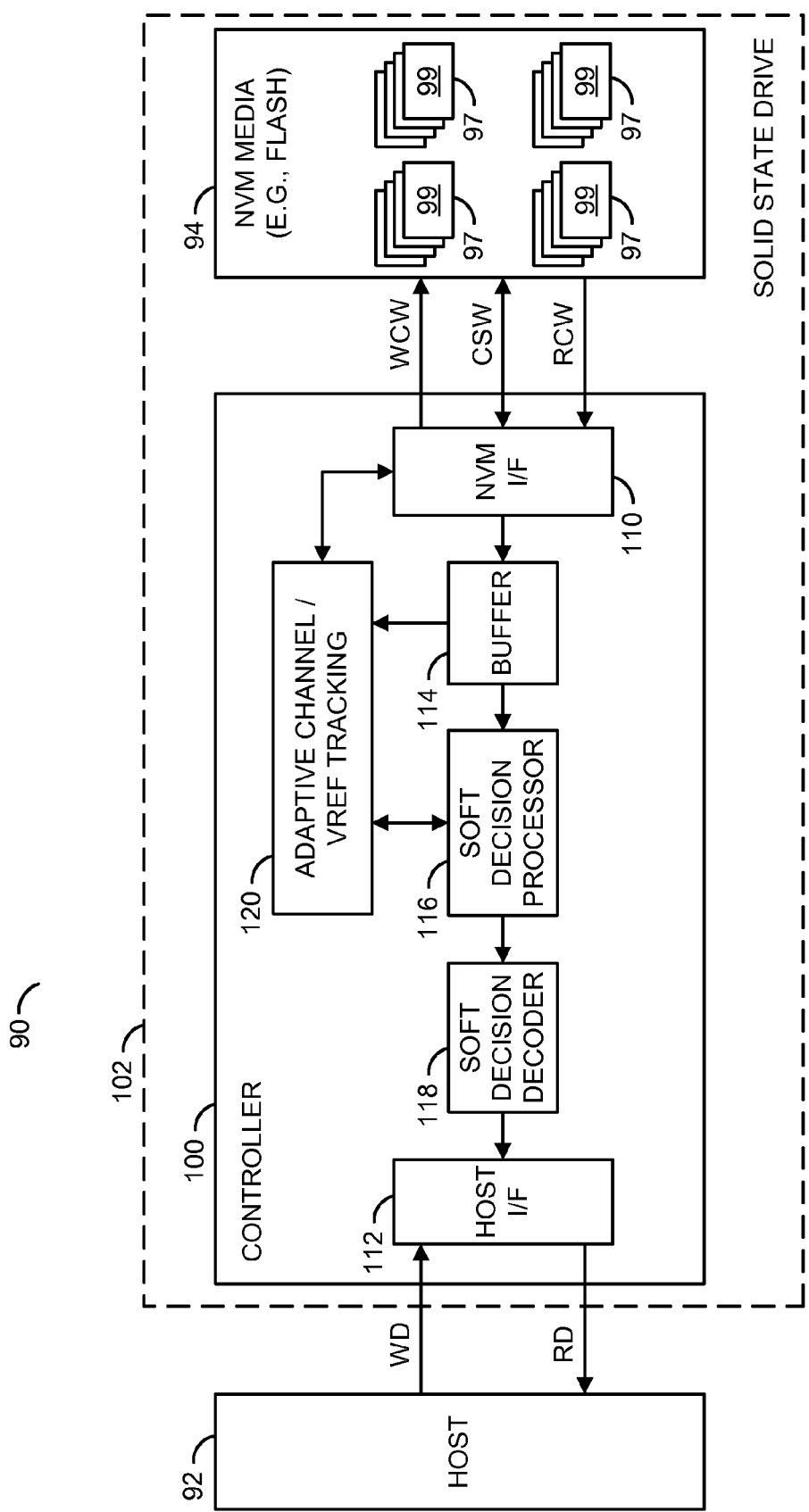
FIG. 1 is a diagram illustrating an example implementation of an apparatus in accordance with an embodiment of the invention.

Referring to FIG. 1, a block diagram of an example implementation of an apparatus 90 is shown. The apparatus (or circuit or device or integrated circuit) 90 implements a computer system having a non-volatile memory circuit. The apparatus 90 generally comprises a block (or circuit) 92, a block (or circuit) 94, and a block (or circuit) 100. The circuits 92, 94 and 100 may represent modules and/or blocks that may be implemented as hardware (circuitry), software, a combination of hardware and software, or other implementations. A combination of the circuits 94 and 100 may form a solid state drive or disk (SSD) 102.

A signal (e.g., WD) is generated by the circuit 92 and presented to the circuit 100. The signal WD generally conveys write data to be written into the circuit 94. A signal (e.g., WCW) is generated by the circuit 100 and transferred to the circuit 94. The signal WCW carries error correction coded (e.g., ECC) write codewords written into the circuit 94. A signal (e.g., CSW) is communicated between the circuit 100 and the circuit 94. The signal CSW carries control and status information. In one example, the signal CSW is operational to communicate read voltage offset values to the circuit 94. A signal (e.g., RCW) is generated by the circuit 94 and received by the circuit 100. The signal RCW carries error correction coded codewords read from the circuit 94. A signal (e.g., RD) is generated by the circuit 100 and presented to the circuit 92. The signal RD carries error corrected versions of the data in the signal RCW. The contents of the signals WD and RD are generally associated with write and read commands (or requests), respectively, from the circuit 92. The circuit 92 is shown implemented as a host circuit. The circuit 92 is generally operational to read and write data to and from the SSD 102. When writing, the circuit 92 presents the write data in the signal WD. The read data requested by the circuit 92 is received via the signal RD.

The circuit 100 is shown implemented as a controller circuit. The circuit 100 is generally operational to control reading from and writing to the circuit 94. The circuit 100 may be implemented as one or more integrated circuits (or chips or die). The circuit 100 may be used for controlling one or more solid state drives, embedded storage, non-volatile memory devices, or other suitable control applications.

In various embodiments, the circuit 100 generally comprises a block (or circuit) 110, a block (or circuit) 112, a block (or circuit) 114, a block (or circuit) 116, a block (or circuit) 118, and a block (or circuit) 120. The circuit 110 implements a non-volatile memory (e.g., flash) interface. The circuit 112 implements a host interface. The circuit 114 implements a memory buffer. The circuit 116 may implement a soft decision processor. The circuit 118 may implement a soft decoder. The circuit 120 may implement a channel and/or read reference voltage (Vref) tracking scheme in accordance with an embodiment of the invention. The circuits 110 to 120 may represent modules and/or blocks that may be implemented as hardware, software, a combination of hardware and software, or other implementations.

The controller 100 is generally coupled to the NVM media 94 via one or more device interfaces implemented by the circuit 110. According to various embodiments, the device interfaces (or protocols) may include, but are not limited to, one or more of: an asynchronous interface; a synchronous interface; a double data rate (DDR) synchronous interface; an ONFI (open NAND flash interface) compatible interface, such as an ONFI 2.2 compatible interface; a Toggle-mode compatible non-volatile memory interface; a non-standard version of any of the preceding interfaces; a custom interface; or any other type of interface used to connect to storage devices. According to various embodiments, the device interfaces are organized as: one or more busses with one or more non-volatile memory devices 97 per bus; one or more groups of busses with one or more non-volatile memory devices 97 per bus, where busses in a group are generally accessed in parallel; or any other organization of non-volatile memory devices 97 coupled to then device interfaces of the circuit 110.

In general, the number of device interfaces implemented by the circuit 110 may be varied between embodiments. In various embodiments, the device interfaces are implemented as flash channels (or flash lanes), each of which has one or more flash devices 97, each of which has one or more flash die 99. For example, in some embodiments, each flash device 97 is configured as a single package with 2 channels and with 2N flash die 99, having N die on one channel, and N die on another channel. A package may be configured to support more than one channel to have more bandwidth. In various embodiments, board-level constraints may dictate a particular configuration, though factors like delivered bandwidth and capacity may come into play, too. For example, a non-volatile memory device 97 having four channels in one package (e.g., that might have 4 or 8 die—either 1 or 2 per channel) may be implemented in order to increase bandwidth (e.g., more channels) without increasing board real estate (e.g., occupying less area than 2 packages, each of which has only 2 channels). The device interfaces implemented in the circuit 110 may also be configured to couple read only memory (ROM) devices (not shown) providing portions of a non-user data area storing system data.

The controller 100 may be coupled to the host 92 via one or more external interfaces implemented by the circuit 112. According to various embodiments, the external interfaces (or protocols) implemented by the circuit 112 may include, but are not limited to, one or more of: a serial advanced technology attachment (SATA) interface; a serial attached small computer system interface (serial SCSI or SAS interface); a (peripheral component interconnect express (PCIe) interface; a Fibre Channel interface; an Ethernet Interface (such as 10 Gigabit Ethernet); a non-standard version of any of the preceding interfaces; a custom interface; or any other type of interface used to interconnect storage and/or communications and/or computing devices. For example, in some embodiments, the controller 100 includes a SATA interface and a PCIe interface.

The host interface 112 sends and receives commands and/or data via the external interface(s), and, in some embodiments, tracks progress of individual commands. For example, the individual commands may include a read command and a write command. The read command may specify an address (such as a logical block address, or LEA) and an amount of data (such as a number of LBA quanta, e.g., sectors) to read; in response the controller 100 provides read status and/or read data. The write command may specify an address (such as an LBA) and an amount of data (such as a number of LBA quanta, e.g., sectors) to write; in response, the controller 100 provides write status and/or requests write data and optionally subsequently provides write status. In some embodiments, the host interface 112 is compatible with a SATA protocol and, using NCQ commands, is enabled to have up to 32 pending commands, each with a unique tag represented as a number from 0 to 31. In some embodiments, the controller 100 is enabled to associate an external tag for a command received via the circuit 116 with an internal tag used to track the command during processing by the controller 100.

According to various embodiments, the controller 100 includes at least one buffer 114, one or more processing units (e.g., soft decision processor 116), and one or more error-correction (ECC) decoders (e.g., soft decoder 118). The one or more processing units may optionally and/or selectively process some or all data sent between the at least one buffer and the circuit 110 and optionally and/or selectively process data stored in the at least one buffer 114. According to various embodiments, the one or more ECC decoders optionally and/or selectively process some or all data sent between the at least one buffer 114 and the device interfaces of the circuit 110, and the one or more ECC decoders optionally and/or selectively process data stored in the at least one buffer 114. In some embodiments, the one or more ECC decoders implement one or more of: a cyclic redundancy check (CRC) code; a Hamming code; an Reed-Solomon (RS) code; a Bose Chaudhuri Hocquenghem (BCH) code; an low-density parity check (LDPC) code; a Viterbi code; a trellis code; a hard-decision code; a soft-decision code; an erasure-based code; any error detecting and/or correcting code; and any combination of the preceding. In some embodiments, the controller 100 uses one or more engines to perform one or more of: encrypting; decrypting; compressing; decompressing; formatting; reformatting; transcoding; and/or any other data processing and/or manipulation task.

In various embodiments, the circuit 110 may be configured to control one or more individual non-volatile memory lanes (channels). Each of the memory lanes is enabled to connect to one or more non-volatile memory devices 97. In some embodiments, the circuit 110 may implement multiple memory lane controller instances to control a plurality of non-volatile memory lanes. The non-volatile memory interface 110 is configured to couple the circuit 100 to the non-volatile memory media 94. The non-volatile memory media 94 may comprise one or more non-volatile memory devices 97. The non-volatile memory devices 97 have, in some embodiments, one or more non-volatile memory units (e.g., die, disk platter, etc.) 99. According to a type of a particular one of the non-volatile memory devices 97, a plurality of non-volatile memory units 99 in the particular non-volatile memory device 97 are optionally and/or selectively accessible in parallel. The non-volatile memory devices 97 are generally representative of one or more types of storage devices enabled to communicatively couple to the circuit 100. However, in various embodiments, any type of storage device is usable, such as SLC (single level cell) NAND flash memory, MLC (multi-level cell) NAND flash memory, TLC (triple level cell) NAND flash memory, NOR flash memory, electrically programmable read-only memory (EPROM or EEPROM), static random access memory (SRAM), dynamic random access memory (DRAM), magneto-resistive random-access memory (MRAM), ferromagnetic memory (e.g., FeRAM, F-RAM FRAM, etc.), phase-change memory (e.g., PRAM, PCRAM, etc.), racetrack memory (or domain-wall memory (DWM)), resistive random-access memory (RRAM or ReRAM), or any other type of memory device or storage medium (e.g., other non-volatile memory devices, hard disk drives (HDDs), communications channels, etc.).

In some embodiments, the circuit 100 and the non-volatile memory media 94 are implemented on separate integrated circuits. When the circuit 100 and the non-volatile memory media 94 are implemented as separate integrated circuits (or devices), the non-volatile memory interface 110 is generally enabled to manage a plurality of data input/output (I/O) pins and a plurality of control I/O pins. The data I/O pins and the control I/O pins may be configured to connect the device containing the controller 100 to the external device (s) forming the non-volatile memory media 94. In various embodiments, the circuit 100 is implemented as an embedded controller.

The host interface 112 is configured to receive commands and send responses to the host 92. In embodiments implementing a plurality of non-volatile memory lanes, the controller 100 and the NVM interface 110 of the circuit 100 may implement multiplexing circuitry coupling multiple instances of memory lane controllers to a processing unit providing scheduling and/or data management of the plurality of non-volatile memory devices 97. In some embodiments, the processing unit comprises data buffering and direct memory access (DMA) engines to store data or other information and to move the data or other information between the host 92 and the NVM media 94 using one or more memory lane controllers within the circuit 100.

When a non-volatile memory read operation is performed (e.g., in response to a request originating either externally from the host 92 or internally from the circuit 100) raw data is retrieved from the NVM media 94 and placed in a buffer (e.g., the buffer 114). In various embodiments, to ensure the data returned is correct, soft decision processing and soft decoder operations are performed in the circuit 100 to correct the raw data read from the NVM media 94. In some embodiments, a LDPC (low-density parity-check) code is used. The soft decoder operations performed in the circuit 110 generally operate on a granularity of a codeword (of fixed or variable size), referred to as an e-page.

In various embodiments, the non-volatile memory (NVM) die 99 comprise a number of planes (e.g., one, two, four etc.). Each plane comprises a number (e.g., 512, 1024, 2048, etc.) of NVM blocks. Each of the NVM blocks comprises a number of pages, such as 128, 256, or 512 pages. A page is generally the minimum-sized unit that can be independently written, and a block is generally the minimum-sized unit that can be independently erased. In various embodiments, each page of the non-volatile memory devices 97 comprises a plurality of e-pages, which may also be referred to as ECC-pages or "read units." Each e-page is an amount of user data and the corresponding ECC data that, together, comprise one ECC codeword (e.g., a correctable unit). Typically, there are an integer number of e-pages per NVM page, or in some embodiments, per multi-plane page. The e-pages are the basic unit that can be read and corrected, hence e-pages are also called read units. Typically, read units may have 1 KB or 2 KB of user data, and an even share of the remaining bytes in the non-volatile memory page (so that all read units in a same one of the multi-plane pages are the same total size). An e-page (or read unit) is thus the minimum-sized unit that can be independently read (and ECC corrected).

The circuit 114 is shown implemented as a buffer (memory) circuit. The circuit 116 is shown implemented as a soft-decision processor circuit. The circuit 114 is operational to buffer (store) codewords (raw data) received from the circuit 94 via the circuit 110. The read codewords are presented from the circuit 114 to the circuit 116. The circuit 116 is operational to generate soft decision information (or decoding parameters), such as in the form of log likelihood ratio (LLR) values. In some embodiments, the circuit 114 is also operational to buffer the soft decision information (e.g., decoding parameters) generated by the circuit 116. The soft decision information is used in a soft-decision decoding process performed by the circuit 118. The decoding parameters are presented by the circuit 116 to circuit 118 directly, or in other embodiments to the circuit 114 for storage (not illustrated). The circuit 116 may be implemented as a dedicated hardware unit that processes raw soft bits read from the circuit 94. The circuit 116 generally uses information regarding an erase state distribution of the circuit 94 in the process of generating the decoding parameters. The circuit 116 may be implemented as a processor core (e.g., an ARM core, etc.) or a custom designed circuit.

The circuit 118 is shown implemented as a soft-decision decoder circuit. In some embodiments, the circuit 118 is implemented as one or more low-density parity-check decoder circuits. The circuit 118 is operational to perform both hard-decision (e.g., HD) decoding and soft-decision (e.g., SD) decoding of the codewords received from the circuit 114. The soft-decision decoding generally utilizes the decoding parameters created by the circuit 116 and/or the circuit 120.

The circuit 120 is shown implemented as an adaptive channel and reference voltage (VREF) tracking circuit. The circuit 120 is operational to track channel parameters and/or statistics. The channel parameters and/or statistics may include, but are not limited to one or more of a count of the number of program and erase (P/E) cycles (PEC), charge loss over time (retention times), program interference from the programming of neighboring cells (write disturb counts), program interference from the reading of neighboring cells (read disturb counts), and non-erase state and/or erase state read voltage distributions. The circuit 120 is operation to communicate read offsets for multiple reads to the circuit 110 for communication to the circuit 94. The circuit 120 receives raw read data for the multiple reads from the circuit 114 and soft decision information from the circuit 116. The circuit 120 is operational to generate one or more metrics/statistics (e.g., weight vectors, etc.) based upon the raw read data. The circuit 120 is also operational provide inputs to the circuit 116 based on one or more of the tracked channel parameters and/or metrics/statistics.

In various embodiments, an estimation task begins with a data collection or gathering step. In various embodiments, the framework can be described using a context of collecting statistics for an adaptive tracking routine. In various embodiments, the circuit 120 computes a metric (e.g., a weight or a count of 1s) at a read reference voltage (e.g., for a lower or upper page). At least one read of the lower page and the upper page is needed to gather weights at a given reference voltage. As many as 20 or 30 reads may be performed to make a robust estimate of channel parameters. Since each one of the reads takes time, and time complexity strains the performance of a flash device, the framework is designed to achieve robust statistics collection with minimal strain on performance. Weights of lower and upper pages are computed at several read reference voltages and processed collectively by an adaptive tracking routine to estimate channel parameters. In various embodiments, the weights (or other metric) are used, in one instance, to estimate optimal upper and lower read threshold voltages.

Figure 2:
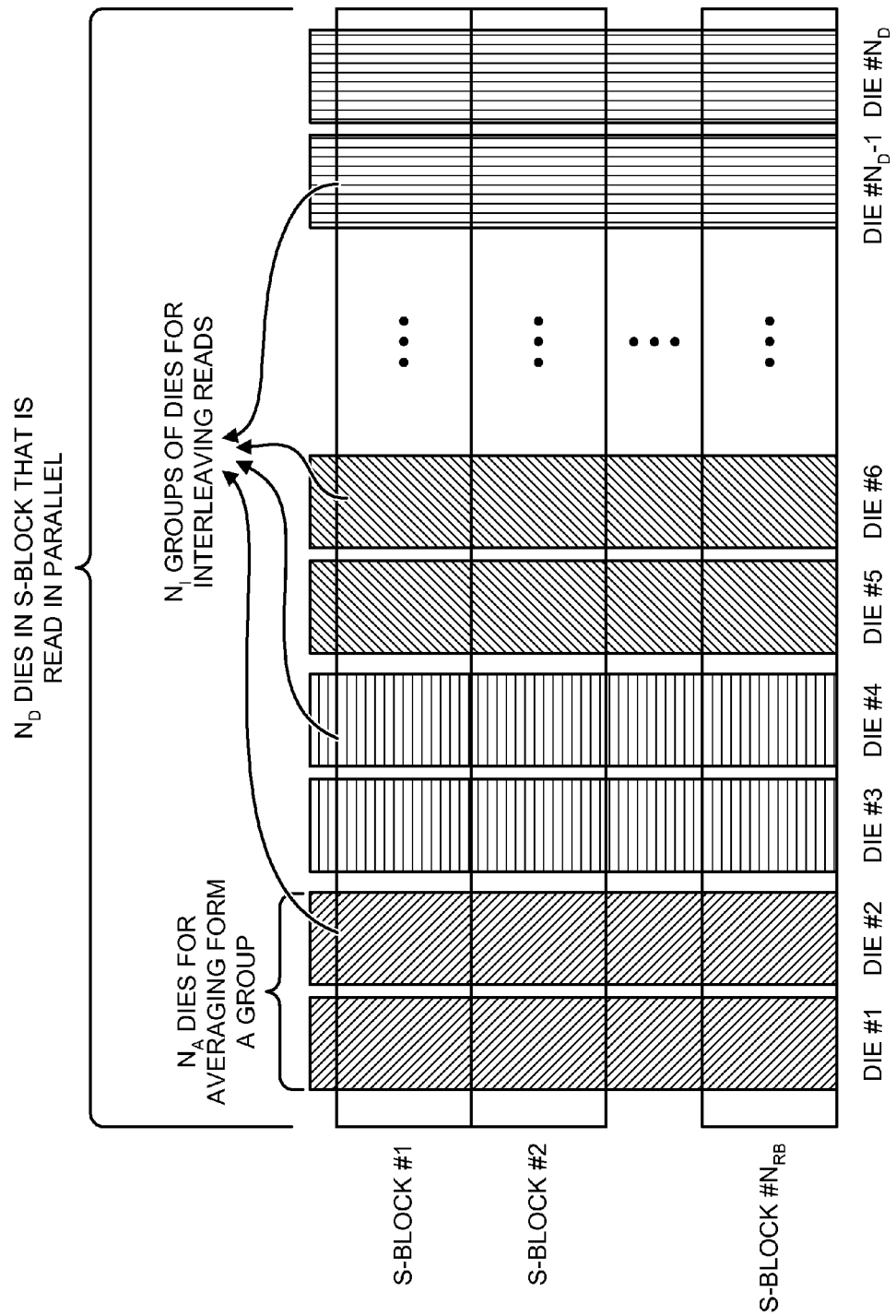
FIG. 2 is a diagram illustrating die grouping in accordance with an embodiment of the invention.

Referring to FIG. 2, a diagram is shown illustrating selected details of an embodiment of super-blocks across multiple NVM devices. In various embodiments, a super-block (or S-block) is an architectural unit that runs across a number (e.g., $N_D$) of dies. In various embodiments, adaptive tracking is performed at the super-block level. FIG. 2 shows a total of $N_{RB}$ S-blocks. Each S-block comprises one block from each of $N_D$ dies. The $N_D$ dies are divided into groups comprising $N_A$ dies (illustrated by shading). A number (e.g., $N_I$) of groups are implemented such that $N_I * N_A = N_D$. The $N_A$ dies within a group are read at the same read reference voltages and the data collected are post-processed to improve statistical robustness. For instance, page weights collected from within a group are averaged to minimize an impact of a small set of outliers. Other post-processing functions may include, but are not limited to median filter, smoothing filter, etc. The value $N_I$ is an interleaving parameter used to control the speed of a data collection step. The $N_I$ groups of dies within an S-block are read at dissimilar read reference voltages and, effectively, $N_I$ unique weight statistics are generated with a single read command.

Figure 3:
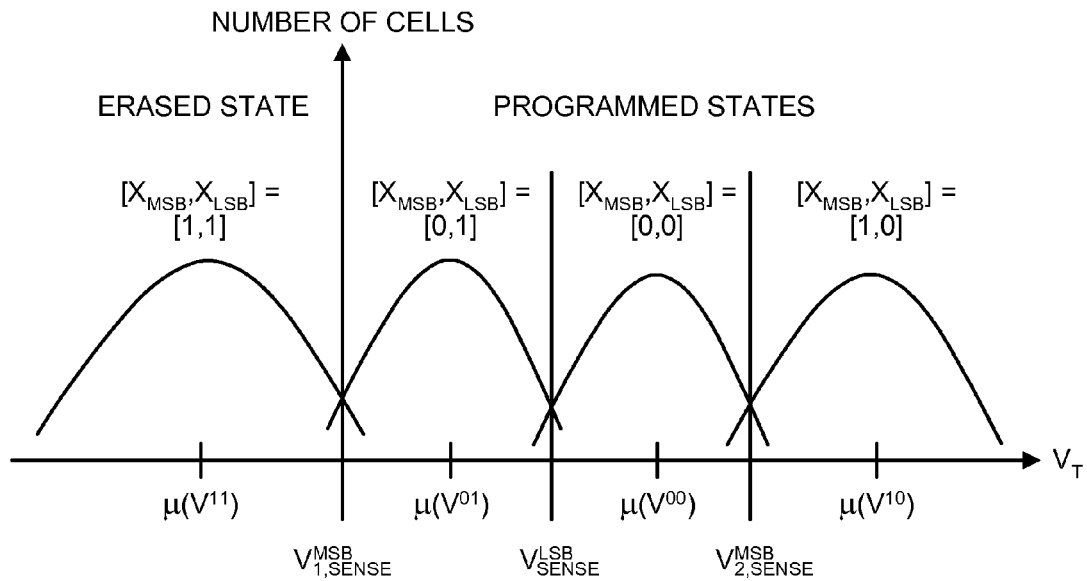
FIG. 3 is a diagram illustrating an example of cell voltage distributions and read reference voltages of a multi-level cell (MLC) flash memory.

Referring to FIG. 3, a diagram illustrating an example of cell voltage distributions and read reference voltages of a multi-level cell (MLC) flash memory is shown. The voltage distributions are centered on four means. A voltage (e.g., $V_{SENSE}^{LSB}$) represents a read reference voltage of a lower page. Voltages (e.g., $V_{1,SENSE}^{MSB}$ and $V_{2,SENSE}^{MSB}$) represent read reference voltages corresponding to an upper page. In various embodiments, the circuit 120 finds optimal values of the read reference voltages to be used in hard and soft reads for the S-block. The particular criterion for determining an optimal value can vary to meet the design criteria of a particular implementation. In some embodiments, a typical criterion is to minimize raw bit error rate.

Figure 4:
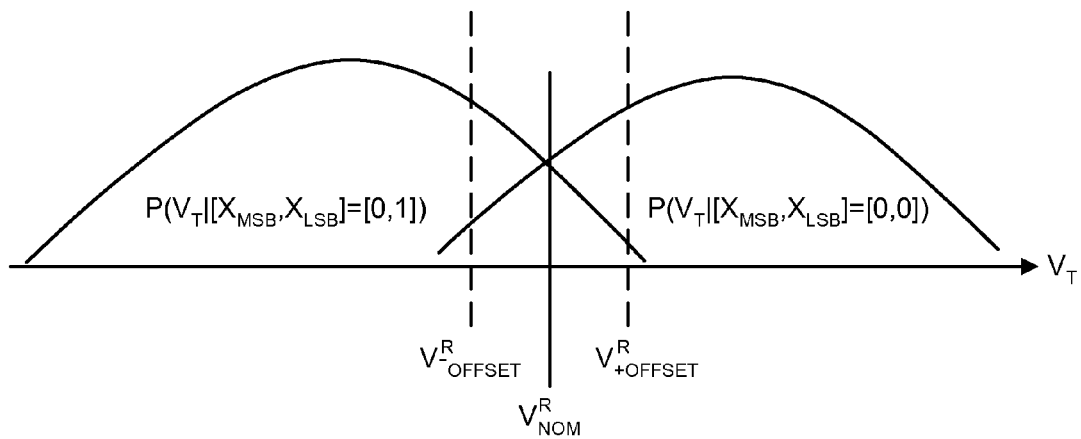
FIG. 4 is a diagram illustrating an example of read offsets.

Referring to FIG. 4, a diagram is shown illustrating an example of read offsets. The hard read operation depends on whether an LSB (lower) or an MSB (upper) page is the target of the read command. When an LSB page is being read, the value of a bit (e.g., $X_{LSB}$), that belongs to the lower page (LSB), is determined based on whether the cell conducts or does not conduct when a sensing voltage (e.g., $V_{SENSE}^{LSB}$) is applied to the cell, as shown in FIG. 3. Then, $$X_{LSB} = \begin{cases} 0, & V_i > V_{SENSE}^{LSB} \\ 1, & V_i < V_{SENSE}^{LSB} \end{cases},$$

where Vt is the threshold voltage of the cell, which is determined by the stored charge of the cell. The value of a bit (e.g., $X_{MSD}$), that belongs to the upper (MSB) page, is determined based on whether the cell conducts or does not conduct when two sensing voltages (e.g., $V_{1,SENSE}^{MSB}$ and $V_{2,SENSE}^{MSB}$) are applied to the cell, also a single hard read, then, $$X_{MSB} = \begin{cases} 0, & V_{2,SENSE}^{MSB} > V_i > V_{1,SENSE}^{MSB} \\ 1, & V_{1,SENSE}^{MSB} > V_i, V_i > V_{2,SENSE}^{MSB} \end{cases}.$$

Referring to FIG. 4, a diagram is shown illustrating example read offsets. In various embodiments, the sensing voltage is applied according to a read offset parameter. FIG. 4 illustrates three threshold voltages (e.g., $V_{NOM}^R$, $V_{+OFFSET}^R$ and $V_{-OFFSET}^R$). The threshold voltage $V_{NOM}^R$ is the voltage at which the first read or hard read is performed. Further reads are performed at and $V_{+OFFSET}^R$ and $V_{-OFFSET}^R$. Multiple reads are often referred to a soft reads. The threshold voltage $V_{NOM}^R$ corresponding to the first read or the default read is referred to as Offset 0. For a predefined offset step size (e.g., Delta_V), read voltages about Offset 0 are labeled with negative and positive offset coefficients. For example, read (or sensing) voltages $V_{NOM-3(Delta\_V)}^R$, $V_{NOM-2(Delta\_V)}^R$, $V_{NOM-(Delta\_V)}^R$, $V_{NOM}^R$, $V_{NOM+(Delta\_V)}^R$, $V_{NOM+2(Delta\_V)}^R$, $V_{NOM+3(Delta\_V)}^R$, etc. may be referred to (or conveyed) as the corresponding Offset coefficients −3, −2, −1, 0, 1, 2, 3, etc. Depending upon the sensing voltage interface implemented, read (or sensing) voltages can be conveyed to the flash memory as offsets (e.g., a number of steps) from $V_{NOM}^R$, or as true sensing voltages (e.g., $V_{NOM-2(Delta\_V)}^R$).

Figure 5:
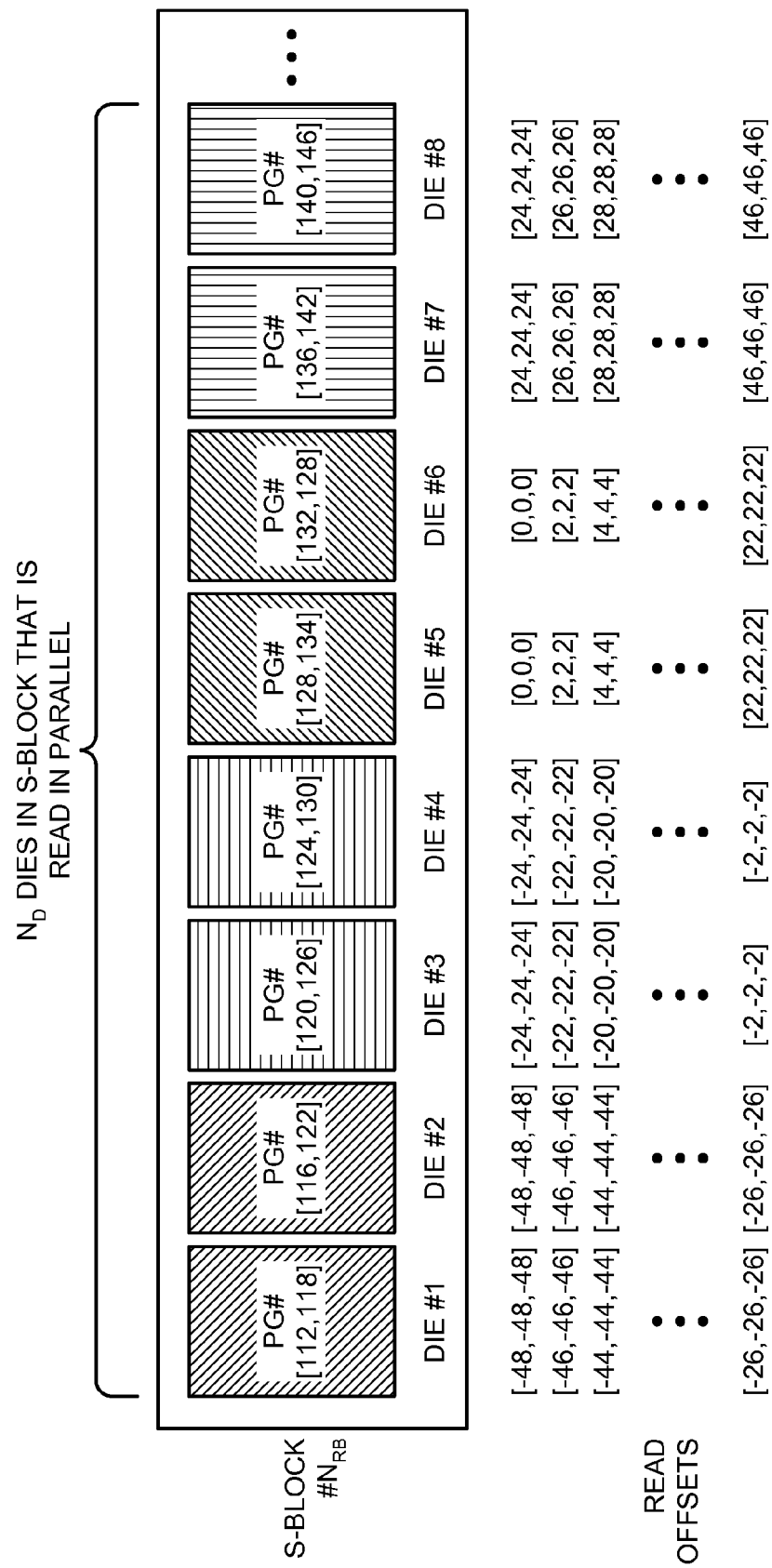
FIG. 5 is a diagram illustrating a tracking example.

Referring to FIG. 5, a diagram is shown illustrating an example tracking operation in accordance with an embodiment of the invention. In one example, the controller 100 may be configured to track even pages and generate a total of $n_R$=48 unique weight statistic at $n_R$ read reference voltages for upper and lower pages. Each read generates a 3-tuple vector of weights corresponding to lower and upper pages. The 3-tuple vector of weights may be represented as

[$W_{LSB}$, $W_{MSB}$, $W_{ERS}$]. The term $W_{LSB}$ represents the number of 1s in the lower page or the weight of the lower page. The term $W_{MSB}$ represents the weight of the upper page. The term $W_{ERS}$ represents the number of 1s due to the erase state. In general, the weight of the upper page, $W_{MSB}$, includes 1s due to the erase state. However, the contribution of 1s due to the erase state may be separated out using the lower page read. Weights of the lower and upper pages are dependent on the choice of read voltages.

The super-block $N_{RB}$ is shown with $N_D$=8 dies. The 8 dies are grouped into four groups. Thus, the number of read interleaves $N_I$=4 and the number of read averages $N_A$=2. To complete the data collection step takes $n_R/n_I$=12 read cycles. In FIG. 5, twelve read offsets are listed underneath each die and dies within a group are read at the same offset within a read cycle. Since tracking is performed at the super-block level, choices of pages across the dies are carefully distributed to achieve, in effect, averaging out of page-to-page variation. Lower pages #112-140 and upper pages #118-146 are read over the 8 dies to account for page-to-page variation.

A 3-tuple vector (e.g., Δ) of offset step size may be defined, one each for read reference voltage corresponding to MSB left, LSB, and MSB right. In FIG. 5, Δ=[2, 2, 2]. A starting offset $r=[V_1^R, V_2^R, V_3^R]$ may also be defined. In various embodiments, the 3-tuple vector is specified in terms of Offset coefficients rather than actual voltages. Sensing voltages are specified also in terms of Offset coefficients rather than actual voltages. For flash types that need actual voltages specified, it is a trivial matter to make appropriate changes to the definitions of Δ and the sensing voltages in order to accommodate the difference. In FIG. 5 the starting offset is set to [−48, −48, −48]. Consequently, subsequent read offsets are [−48+2, −48+2, −48+2]=[−46, −46, −46], [−44, −44, −44], . . . , [46, 46, 46]. The two vectors Δ and r allow for maximum flexibility with data collection.

Figure 6:
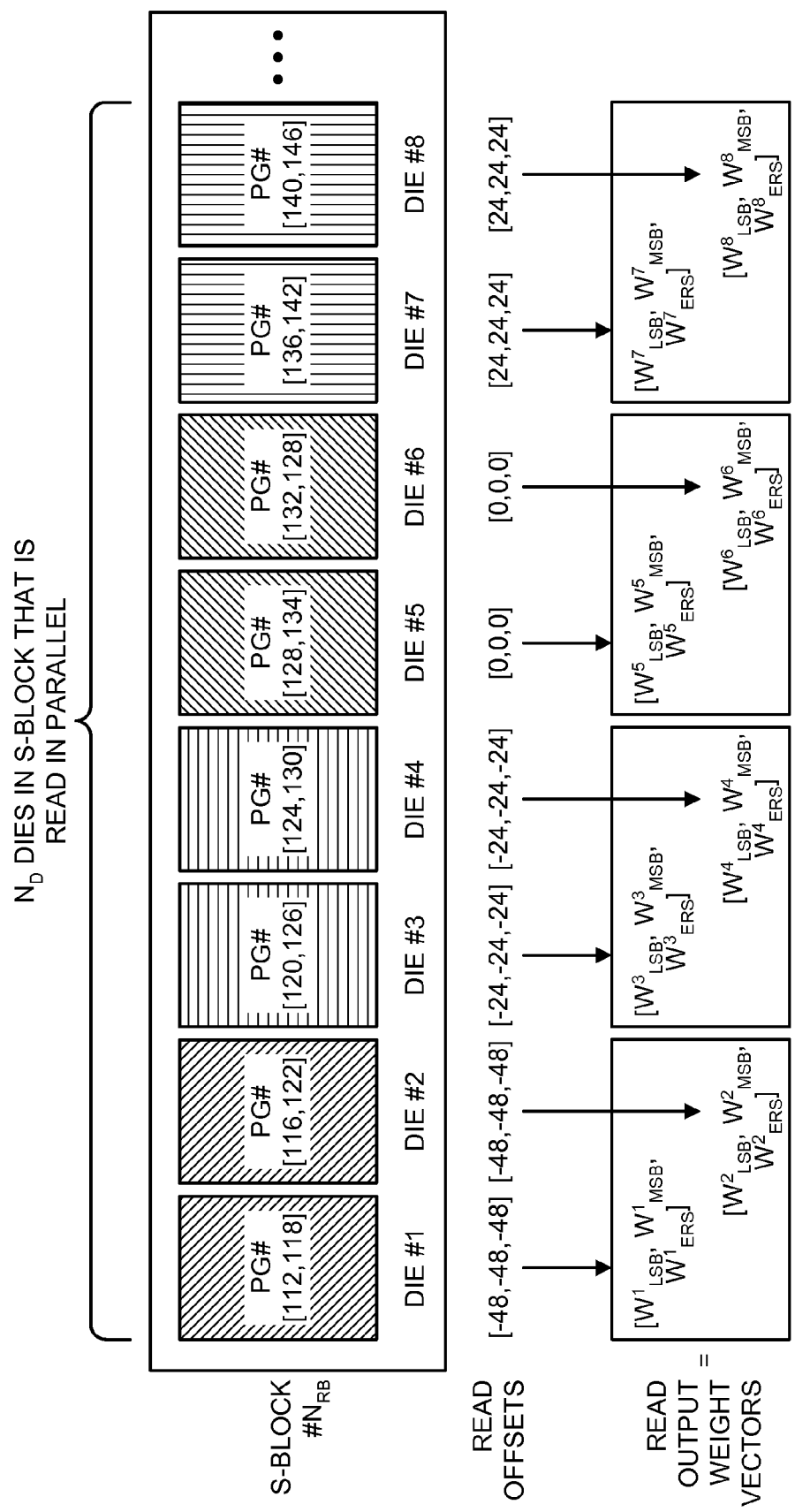
FIG. 6 is a diagram illustrating generation of weight vectors based on a single read.

Referring to FIG. 6, a diagram is shown illustrating $N_D$ 3-tuple weight vectors being generated with a single read. In one example, Die #1 and Die #2 are read with a read voltage setting of [−48, −48, −48], Die #3 and Die #4 are read with a read voltage setting of [−24, −24, −24], Die #5 and Die #6 are read with a read voltage setting of [0,0,0], and Die #7 and Die #8 are read with a read voltage setting of [24,24,24]. The output of each read is a 3-tuple vector comprising the number of 1s in the lower page ($W_{LSB}$), the number of 1s in the upper page and the number of 1s from the erase state ($W_{ERS}$). The count of 1s in a page is often referred to as the weight of the page. Upper page 1s come from the erase state 11 and the programmed state 10. The is from the erase state are distinguishable from the is of the programmed state using the lower page read. In FIG. 6, the 3-tuple vector outputs from reads on the 8 dies are identified with superscripts corresponding the respective die number.

Figure 7:
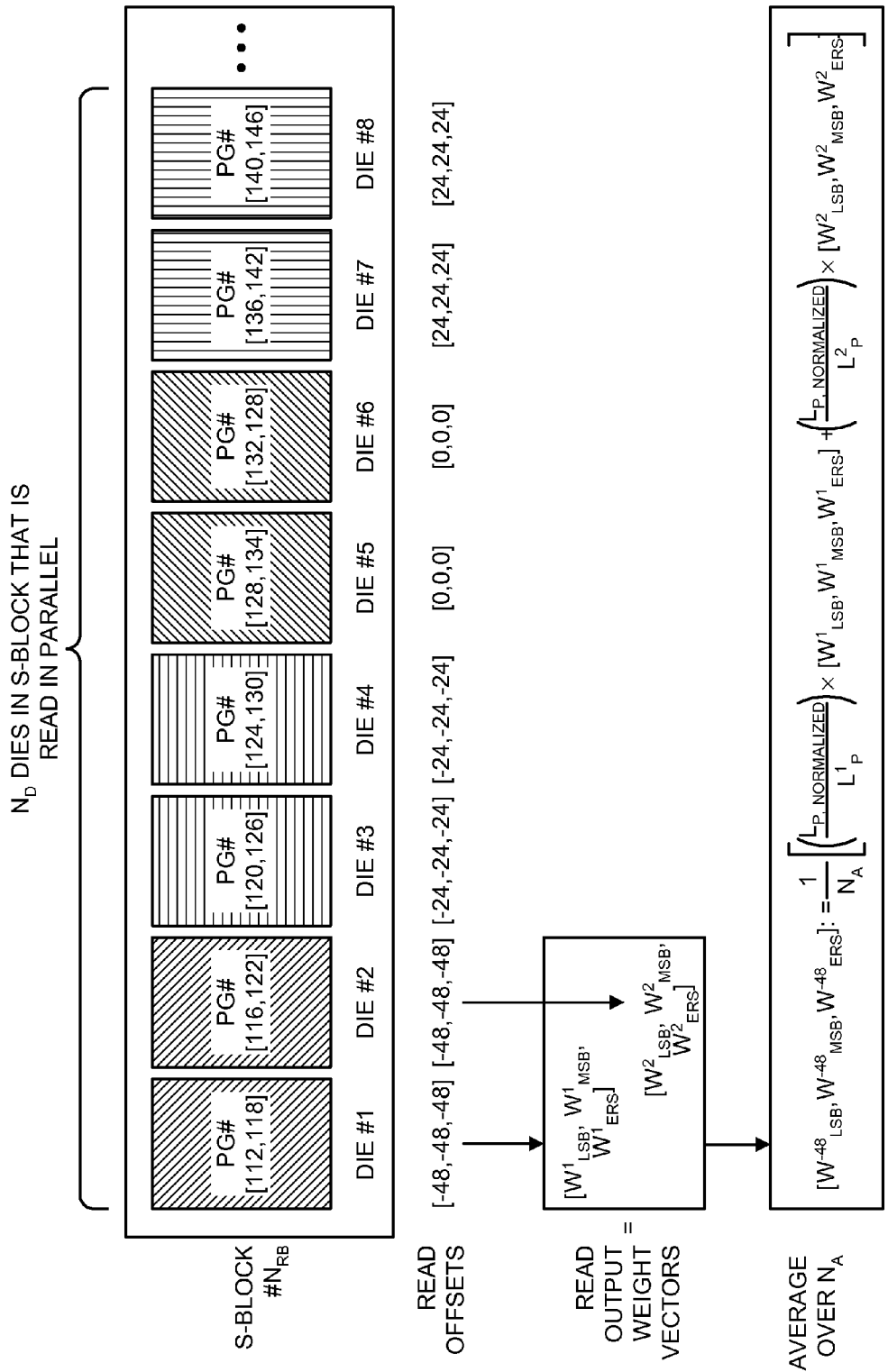
FIG. 7 is a diagram illustrating a post-processing operation over weight vectors from within a group.

Referring to FIG. 7, a diagram is shown illustrating a post-processing operation over weight vectors from within a group. In various embodiments, weight vectors are averaged component wise. The averaging operation is shown only for Dies #1 and #2 for illustrative purposes. The weight vectors of each group are performed accordingly. Page lengths across dies may vary and this difference is accommodated for with a simple normalization to a chosen page size, referred to as $L_{P,Normalized}$.

Figure 8:
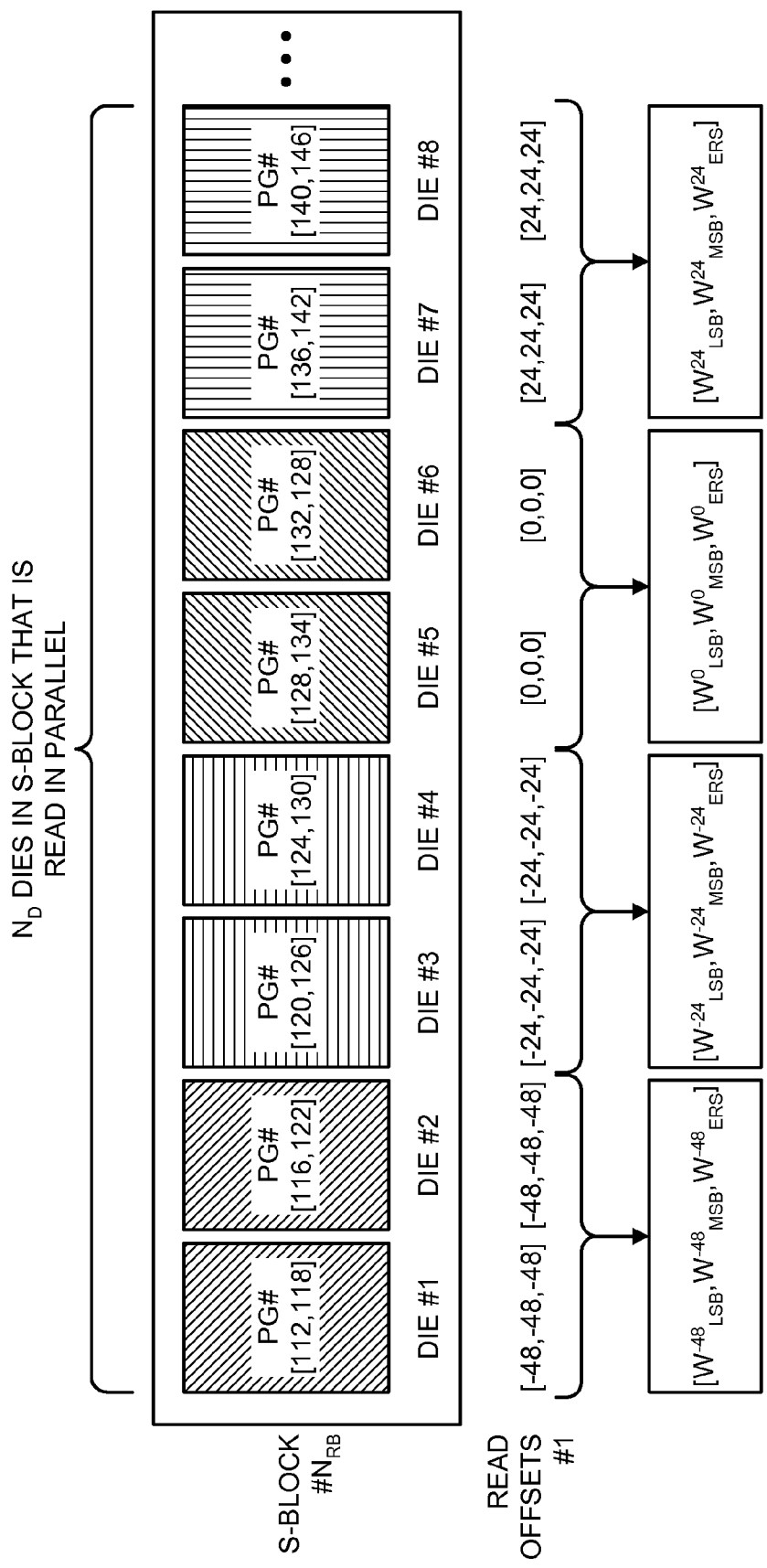
FIG. 8 is a diagram illustrating averaging over a group results in 4 distinct weight vectors.

Referring to FIG. 8, a diagram is shown illustrating averaging over each of the groups in an S-block resulting in 4 distinct weight vectors.

Figure 9:
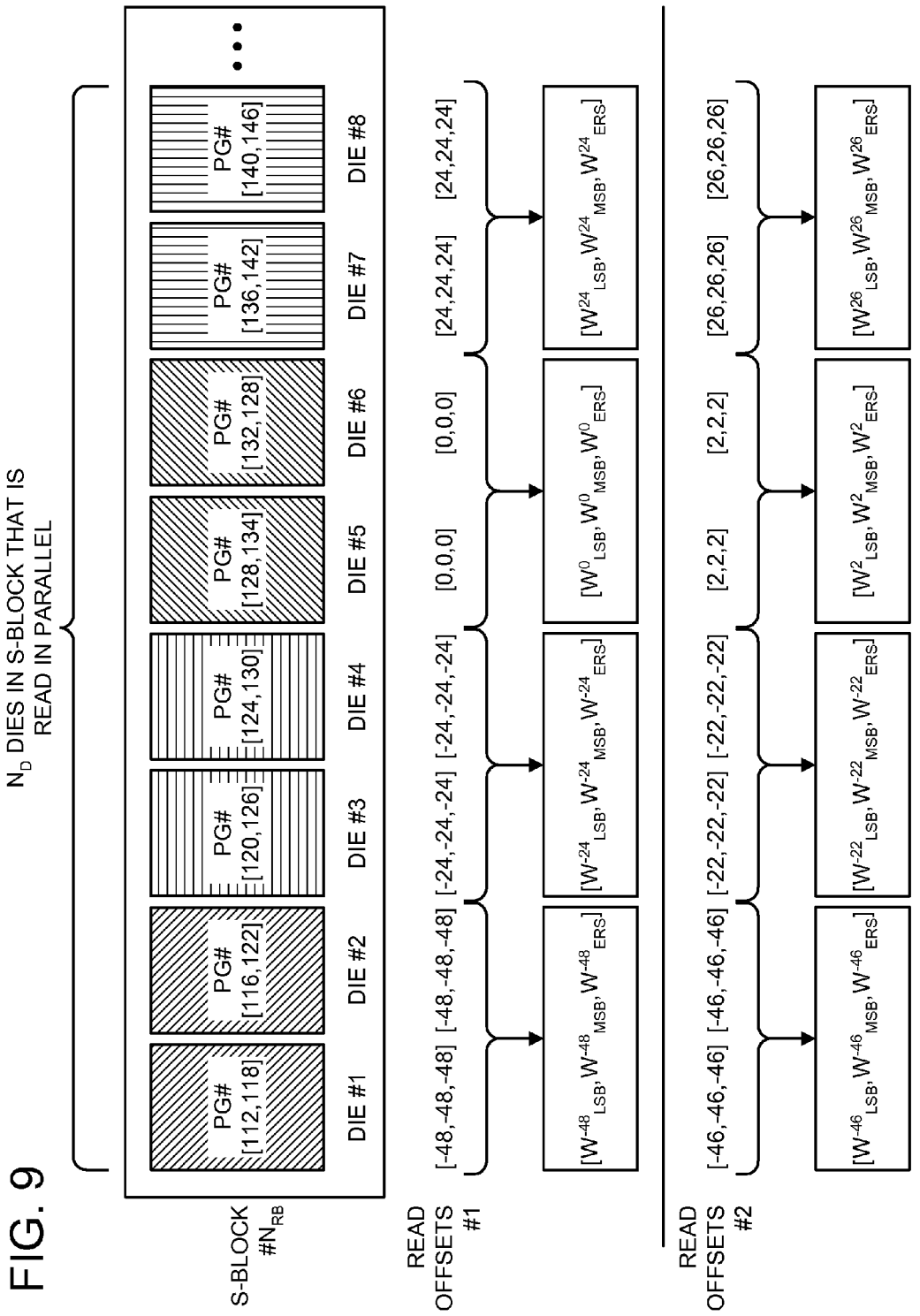
FIG. 9 is a diagram illustrating an example read operation.

Referring to FIG. 9, a diagram is shown illustrating the generation of weight vectors with each read operation. With every read producing 4 valid weight vectors, a total of 48 valid weight vectors is generated when the 12 reads illustrated in FIG. 5 are completed.

The framework described in the context of data collection for adaptive tracking can be applied to other data collection tasks. Additionally, another layer of generalization can be added to the above framework. In some embodiments, the scheme breaks the available dies into two sets, one for upper pages and the other for lower pages, and data collection then proceeds in the manner described above. In one instance, the scheme may be performed in the following manner: Split the $N_D$ dies into two sets, one each for lower and upper pages (e.g., $N_D/2$=4 dies are used to collect page weights for lower pages and the other 4 dies are used to collect page weights for upper pages). Across all lower page reads, MSB related voltages are set to default or previously tracked read reference voltages. Similarly, across all upper page reads, LSB related voltages are set to default or previously tracked read reference voltage. The concepts of averaging and interleaving described above are applied within each set (e.g., of 4 dies).

The choice of values for $N_I$ and $N_A$ allow for tradeoff between speed of data collection and robustness of the data. For example, when $N_A$=8 significant averaging tends to improve robustness but takes $n_R$=48 read cycles. When $N_I$=8, $N_A$=1 and averaging takes a mere 6 read cycles, but compromises on robustness. The framework allows a designer to set the parameters in a way that suits criteria of a particular design. In various embodiments, the values are assigned in firmware.

Figure 10:
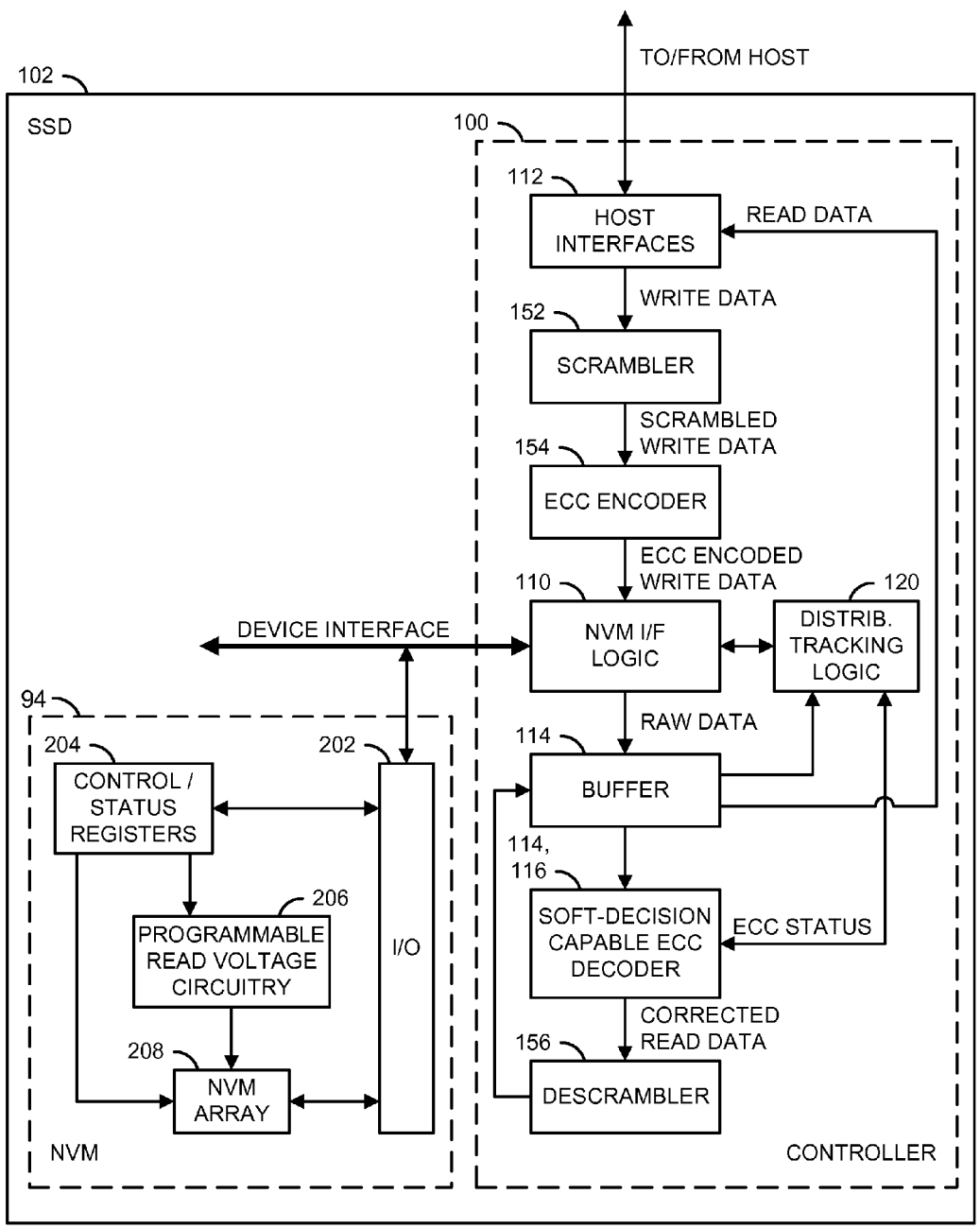
FIG. 10 is a diagram illustrating selected details of a system implementation of an instance of the apparatus of FIG. 1.

Referring to FIG. 10 a diagram is shown illustrating selected details of a system implementation of an instance of the circuit 102 of FIG. 1. Similar to the system 90 shown in FIG. 1, the circuit 102 at the top level comprises non-volatile media 94 and SSD controller 100. The SSD controller 100 features a non-volatile media (NVM) interface 110, a host interface 112, a buffer 114, a soft-decision capable ECC decoder (e.g., corresponding to circuits 116 and 118 of FIG. 1), and distribution tracking logic 120. In various embodiments, the SSD controller 100 also features a scrambler 152, an ECC encoder 154, and a descrambler 156.

The host interface 112 couples to a host, such as host 92 of FIG. 1, and supports a high-level storage protocol such as SATA, including host-sourced storage-related commands and write data and controller-sourced read data, as described above. The NVM interface 110 provides a device interface supporting low-level NVM I/O transactions, as detailed above. The NVM 94 features an I/O interface 202, control and status registers (CSR) 204, programmable read voltage circuitry 206, and an NVM array 208. The controller 100 send read commands including read offset voltages to the NVM 94 vis the NVM I/F logic 110 and the I/O interface 202. The programmable read voltage circuitry 206 generates read (or sense) voltages based on read offsets received with the read commands. The controller 100 receives raw data (bits) from multiple reads at multiple read offsets of the pages of the NVM array 208 via the I/O interface 202. The controller 100 generates statistics/metrics (e.g., weights or counts of 1 s) based on multiple reads at multiple read offsets using the distribution tracking logic 120. The statistics/metrics generated by the distribution tracking logic 120 are used to adapt various operations of the controller 100.

Figure 11:
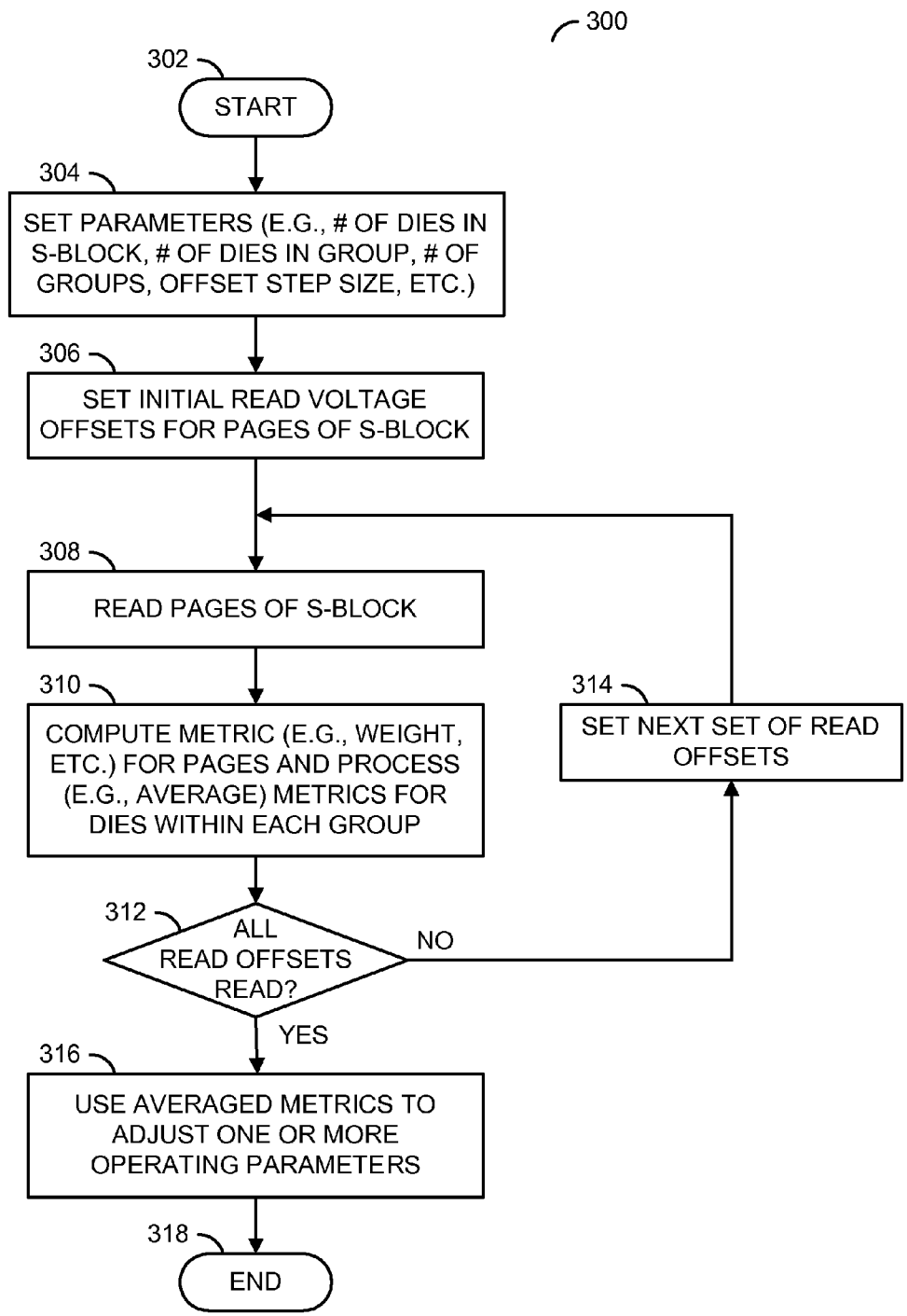
FIG. 11 is a flow diagram illustrating a process in accordance with an embodiment of the invention.

Referring to FIG. 11, a flow diagram illustrating a process 300 in accordance with an embodiment of the invention. In various embodiments, the process (or method) 300 comprises a step (or state) 302, a step (or state) 304, a step (or state) 306, a step (or state) 308, a step (or state) 310, a step (or state) 312, a step (or state) 314, a step (or state) 316, and a step (or state) 318. The process 300 starts in the step 302. In the step 304, the process 300 sets parameters for a framework of statistics collection. The parameters may include, but are not limited to one or more of number of dies in each S-block, number of dies in a group, number of groups in each S-block, read offset step size, etc. In the step 306, the process 300 set an initial read offset for performing multiple reads at multiple read offsets. In the step 308, the process 300 reads the pages of a S-block with each group of dies having a different read offset. In the step 310, the process 300 computes metrics (e.g., weights) using the raw data returned in response to the reads. If more reads are to be performed, the process 300 moves to the step 314, sets the next set of read offsets, and goes to the step 308 to repeat the read operation with the new offsets. Otherwise, the process 300 goes to the step 316, where the generated metrics are used to adjust one or more operations and/or operating parameters. The process 300 ends in the step 318.

The framework in accordance with embodiments of the invention has been described in the context of collecting statistics for an adaptive tracking routine. However, the framework may be applied in other applications as well. For example, another application in which the framework in accordance with an embodiment of the invention may be implemented is inter-cell-interference (ICI) cancellation or compensation. In ICI cancellation or compensation embodiments, statistics relevant to ICI cancellation or compensation are collected from the media using the framework described above. For ICI cancellation, conditional voltage distributions of MLC states may be generated. Voltage distributions of a cell conditioned on adjacent aggressor cells involves reads at multiple sense voltages across multiple pages of blocks/S-blocks. The framework described above is convenient to generate these distributions.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The functions performed by the diagrams of FIGS. 2-11 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multichip modules. Those skilled in the relevant art(s) would understand that the elements of the invention may be implemented in other types of devices to meet the criteria of a particular application.

While the invention has been particularly shown and described with reference to embodiments thereof, it will be understood by those skilled in the art that various changes in form and details may be made without departing from the scope of the invention.

The invention claimed is:

1. An apparatus comprising:
 a memory comprising a plurality of memory devices; and
 a controller coupled to the memory and configured to process a plurality of read/write operations to/from the memory, store data in the plurality of memory devices using units of super-blocks, and generate a number of unique weight statistics in a single read operation by reading a number of dies within a super-block with dissimilar read reference voltages, wherein each super-block comprises a block from a die of each of the plurality of memory devices, and the number of unique weight statistics are represented by 3-tuple vectors of weights.

2. The apparatus according to claim 1, wherein the controller is further configured to balance time efficiency and robustness during collection of statistics from soft reads of each super-block by setting a number of parameters of an adaptive tracking routine.

3. The apparatus according to claim 2, wherein the parameters comprise a first parameter defining a number of dies in a group and a second parameter defining a number of groups.

4. The apparatus according to claim 3, wherein the adaptive tracking routine is configured to average a number of page weights collected from within each group.

5. The apparatus according to claim 1, wherein the controller is further configured to perform one or more of:
averaging page weights on a component weight basis; and
choosing pages across the dies of each super-block such that the pages are distributed to average out page-to-page variation.

6. The apparatus according to claim 1, wherein the controller is further configured to split the number of dies in each super-block into two sets and collect page weights for upper pages from one of the two sets and page weights for lower pages from the other of the two sets.

7. The apparatus according to claim 6, wherein:
across all lower page reads, MSB related voltages are set to default or previously tracked read reference voltages;
across all upper page reads, LSB related voltages are set to default or previously tracked read reference voltages; and
averaging and interleaving are applied within each set.

8. The apparatus according to claim 1, wherein the memory and the controller are part of a solid state drive (SSD).

9. A method of collecting statistics from soft reads of a flash memory comprising:
storing data in a plurality of flash memory devices using units of super-blocks, wherein each super-block comprises a block from a die of each of the plurality of flash memory devices; and
generating a number of unique weight statistics in a single read operation by reading a number of the dies within a super-block with dissimilar read reference voltages, wherein the number of unique weight statistics are represented by 3-tuple vectors of weights.

10. The method according to claim 9, further comprising:
splitting the number of dies in each super-block into two sets to collect page weights for upper and lower pages.

11. The method according to claim 10, wherein:
across all lower page reads, MSB related voltages are set to default or previously tracked read reference voltages;
across all upper page reads, LSB related voltages are set to default or previously tracked read reference voltages; and
averaging and interleaving are applied within each set.

12. The method according to claim 9, further comprising:
choosing pages across the dies of each super-block such that the pages are distributed to average out page-to-page variation.

13. The method according to claim 9, further comprising:
balancing time efficiency and robustness during collection of statistics from soft reads of each super-block by setting a number of parameters of an adaptive tracking routine.

14. The method according to claim 13, wherein the parameters comprise a first parameter defining a number of dies in a group and a second parameter defining a number of groups in each super-block.

15. The method according to claim 14, wherein the adaptive tracking routine is configured to average a number of page weights collected from within a group.

16. An apparatus comprising:
an interface configured to process a plurality of read/write operations to/from a memory comprising a plurality of memory devices; and
a control circuit configured to store data in the plurality of memory devices using units of super-blocks, balance time efficiency and robustness during collection of statistics from soft reads of each super-block, and generate a number of unique weight statistics in a single read operation by reading a number of dies within a super-block with dissimilar read reference voltages, wherein each super-block comprises a block from a die of each of the plurality of memory devices, and the number of unique weight statistics are represented by 3-tuple vectors of weights.

17. The apparatus according to claim 16, wherein the control circuit is further configured to split the number of dies in each super-block into two sets and collect page weights for upper pages from one of the two sets and page weights for lower pages from the other of the two sets.

18. The apparatus according to claim 16, wherein the interface and the control circuit are part of a solid state drive (SSD) controller.

* * * * *